(12) United States Patent
Womack, II (10) Patent No.: US 12,509,151 B1
(45) Date of Patent: Dec. 30, 2025

(54) ZERO TURN RIDING MOWER STEERING MECHANISM

(71) Applicant: Bernard Adolphus Womack, II, Shenandoah, VA (US)

(72) Inventor: Bernard Adolphus Womack, II, Shenandoah, VA (US)

( * ) Notice: Subject to any disclaimer, the term of this patent is extended or adjusted under 35 U.S.C. 154(b) by 0 days.

(21) Appl. No.: 19/272,914

(22) Filed: Jul. 17, 2025

(51) Int. Cl.
*B62D 11/00* (2006.01)
*A01D 34/64* (2006.01)
*A01D 101/00* (2006.01)
*B62D 1/22* (2006.01)

(52) U.S. Cl.
CPC .............. *B62D 11/003* (2013.01); *B62D 1/22* (2013.01); *A01D 34/64* (2013.01); *A01D 2101/00* (2013.01)

(58) Field of Classification Search
CPC .......... B62D 11/003; B62D 1/22; B62D 1/12; A01D 34/64; A01D 34/006; A01D 2101/00
USPC .......................................................... 180/315
See application file for complete search history.

(56) References Cited

U.S. PATENT DOCUMENTS

| | | | | |
|---|---|---|---|---|
| 7,849,941 B2 * | 12/2010 | Bares | ................ | B62D 11/006 180/6.32 |
| 8,186,475 B2 * | 5/2012 | Sugden | ................ | B60N 2/544 |
| 8,522,901 B1 * | 9/2013 | VanLue | ................ | B62D 11/04 56/15.8 |
| 9,021,914 B1 * | 5/2015 | Newcomb | ............ | F16H 63/067 74/481 |
| 9,682,723 B2 * | 6/2017 | Weinlader | ............ | B62D 11/006 |
| 10,046,798 B2 * | 8/2018 | Reeves | ................ | B62D 51/001 |
| 10,293,855 B2 * | 5/2019 | Swecker | ................ | B62D 11/04 |
| 10,780,918 B2 * | 9/2020 | Buchanan | ................ | B62D 9/00 |
| 11,565,749 B1 | 1/2023 | Womack | | |
| 2006/0175098 A1 * | 8/2006 | Sutherland | ............ | B62D 11/24 180/6.24 |
| 2011/0079104 A1 * | 4/2011 | Sama | ................ | G05G 1/54 74/512 |

FOREIGN PATENT DOCUMENTS

WO WO-2014110530 A1 * 7/2014 .............. F04B 17/05

* cited by examiner

*Primary Examiner* — Paul N Dickson
*Assistant Examiner* — Caitlin Anne Miller
(74) *Attorney, Agent, or Firm* — R. William Graham (57) ABSTRACT

A zero turn riding lawnmower mechanism for a zero turn riding lawnmower having a frame, motor, a hydrostatic drive, wheels, electronic steering actuator, operator platform includes a first foot pedal and a second pedal each of which is operably connected to either the a hydrostatic drive, a mechanical steering device or the electronic steering actuator by way of a flexible push/pull cable linkage, each of the first foot pedal and second foot pedal constructed to cause at least one wheel on a respective side the zero turn riding lawnmower to be powered in a forward direction or a reverse direction, wherein the zero turn riding lawnmower is steerable solely via each of the foot pedals.

8 Claims, 7 Drawing Sheets

ZERO TURN RIDING MOWER STEERING MECHANISM

FIELD OF INVENTION

The instant invention relates to steering mechanisms for a zero turn riding lawnmower. More particularly, the invention relates to improvements in foot control for zero turn riding.

BACKGROUND OF THE INVENTION

Prior Art

The instant inventor recognized the need for a riding lawnmower that allowed steering of the riding lawnmower solely via feet of a user. U.S. Pat. No. 11,565,749 was issued to inventor for the improvements to zero turn riding lawnmowers controlled via foot pedals thereby permitting a user to perform tasks more efficiently with a riding lawnmower controlled solely via foot pedals.

For example, a user can perform edging and/or weed eating work while controlling the riding lawnmower with feet only. More specifically, both hands can be used to perform edging, weed eating, and/or other tasks that utilize handheld devices such as blowers, etc. because hands and/or arms of the user are not utilized in controlling movement of the riding lawnmower.

While the improvement in zero turn riding lawnmowers is significant, there remained a need to continue to improve on the system for enabling a more user friendly approach to accomplish this goal. The instant invention is an improvement to the inventor's prior system overcoming inefficiencies thereof.

SUMMARY THE INVENTION

It is an object to improve steering mechanisms in a zero turn riding lawnmower.

It is another object to improve the safety in operating a zero turn riding lawnmower which uses a foot control system.

Accordingly, the invention is directed to a zero turn riding lawnmower steering mechanism for a zero turn riding lawnmower. The zero turn riding lawnmower steering mechanism including a first foot pedal, the first foot pedal operably connected to either a hydrostatic drive (e.g., a transaxle or separate pump and motor combination), an electronic steering actuator or mechanical steering device by way of a first flexible push/pull cable linkage. The first foot pedal is constructed to cause at least one wheel on a first side the zero turn riding lawnmower to be powered in a forward direction or a reverse direction;

A second foot pedal is provided, the second foot pedal operably connected to either a hydrostatic drive (e.g., a transaxle or separate pump and motor combination), an electronic steering actuator or mechanical steering device by way of a first flexible push/pull cable linkage. The second foot pedal is constructed to cause at least one wheel on a second side the zero turn riding lawnmower to be powered in a forward or reverse direction, wherein the zero turn riding lawnmower is steerable solely via each of the first foot pedal and the second foot pedal. In a preferred embodiment, at least a part of each linkage is disposed beneath a operator platform of the zero turn radius lawnmower. Brackets on are provided for connecting each push/pull cable linkage to the mower. In a preferred embodiment, the brackets can be connected to either the operator platform or frame for example, depending on the mower type. Each foot pedal is pivotally mounted to rotate about an axis and are preferably spaced from the operator platform.

Other objects and advantages will be apparent from reading the following description and viewing the drawings.

DETAILED DESCRIPTION OF THE PREFERRED EMBODIMENTS

Referring now to the drawings, the zero turn riding lawnmower steering mechanism incorporating the invention is generally designated by the numeral 5. Certain exemplary embodiments utilize zero turn riding lawnmower 10 which can be of various manufacturer, types and can be been constructed and/or modified to allow steering of the zero turn riding lawnmower 10 solely via feet of a user with the zero turn riding lawnmower steering mechanism 5.

The improvement in the zero turn riding lawnmower steering mechanism 5 resides in using flexible push/pull cable linkages 12 and 14 as will be discussed hereinafter. By so providing flexible push/pull cable linkages 12 and 14, preferably in a manner to place them out of the way of such as below an a operator platform 16 or frame 11 of the zero turn riding lawnmower 10, there is a reduced trip hazard to the user and overall improved user experience at a minimal comparative cost.

Accordingly, a user can perform tasks more efficiently with zero turn riding lawnmower 10 controlled solely via foot pedals with reduced risk of injury. The user can perform edging and/or weed eating work while controlling the riding lawnmower with feet only. As before, the user can utilize both hands to perform edging, weed eating, and/or other tasks that utilize handheld devices such as blowers, etc., because hands and/or arms of the user are not utilized in controlling movement of the riding lawnmower and the user can gain ingress and egress to the seating area with minimized interference via in the flexible push/pull cable linkages 12 and 14.

Existing zero turn riding lawnmowers can be modified for foot control via removal of a portion 18A 18B of hand lever control that would otherwise be used for control when grasped by hands of the user and revealing and connecting flexible push/pull cable linkage 12 and 14 to the respective electronic steering actuator 20A, 20B or optionally directly to a hydrostatic drive (e.g., a transaxle or separate pump and motor combination) 50.

Figure 2:
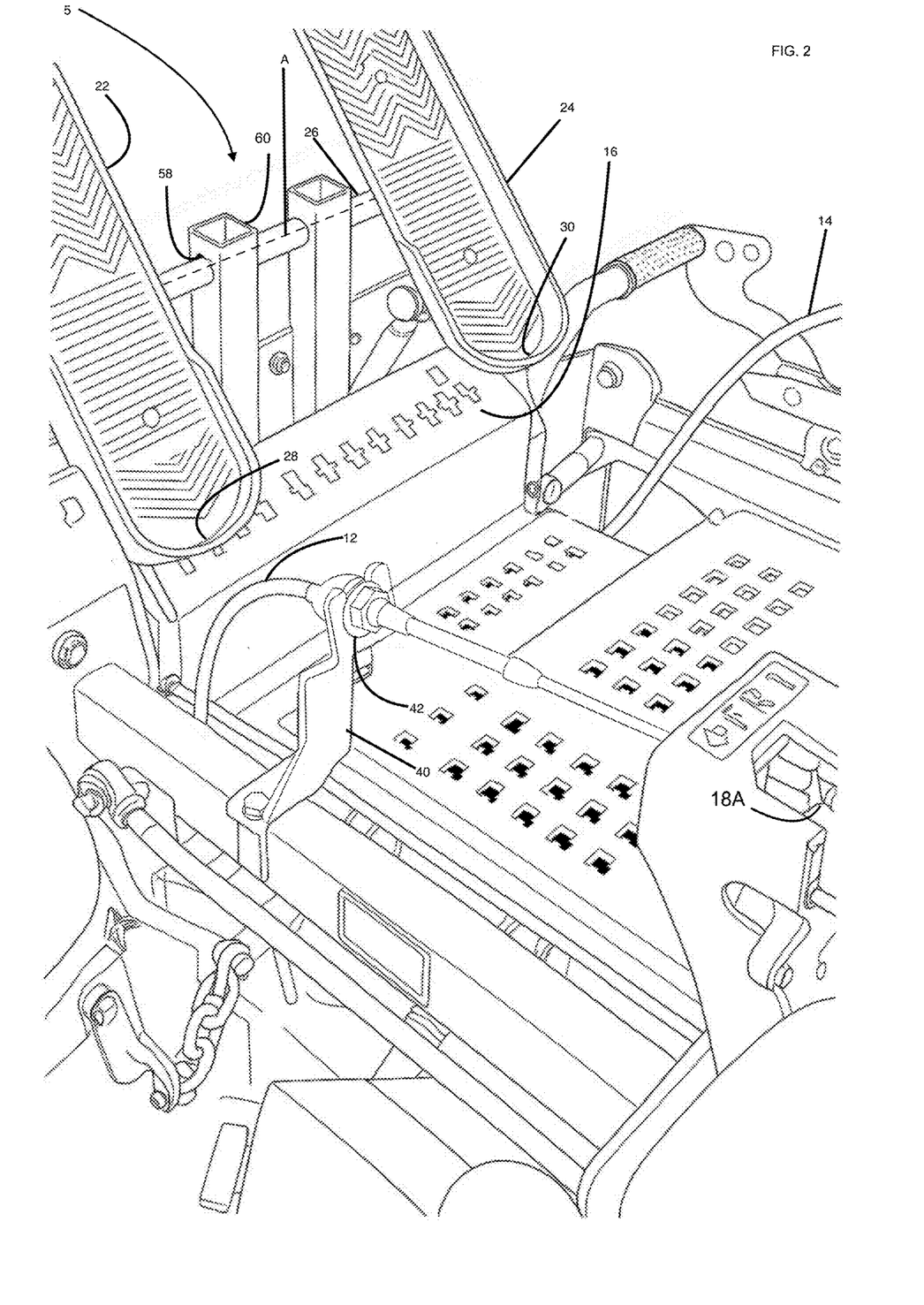
FIG. 2 is a perspective view of a foot portion of the zero turn riding lawnmower in FIG. 1 illustrating an aspect of the invention.

As depicted in FIG. 2, flexible push/pull cable linkages 12 and 14 enable forward/reverse by way of connection to a first foot pedal 22 and a second foot pedal 24, which are pivotally connected to a pivot rod 26. The pivot rod 26 extends through coaxial bearing surfaces 58 of support riser 60 which is mounted to part of the zero turn riding lawnmower 10. Each foot pedal 22 and 24 have a respective upper portion 28 and 30 and lower portion 31 and 33.

Here, the pivotal connection between each foot pedal 22 and 24 and the pivot rod 26 disposed upwardly from the lower portion 28 and 30, unlike prior design, and in a manner to suspend each foot pedal 22 and 24 spaced from the operator platform 16 so that each foot pedal 22 and 24 can rotate about an axis A of the pivot rod 26 and enable a push/pull of each push/pull cable linkage 12 and 14 by using foot pressure against upper portion 29, 31 (top) or lower portion 28, 30 (bottom) of each foot pedal 22 and 24. In this regard the upper portion 29, 31 or lower portion 28, 30 (bottom) rotate about inwardly disposed axis A. The first foot pedal 22 and second foot pedal 24 are pivotally mounted to rotate about axis A and are spaced from the operator platform 16.

Figure 3:
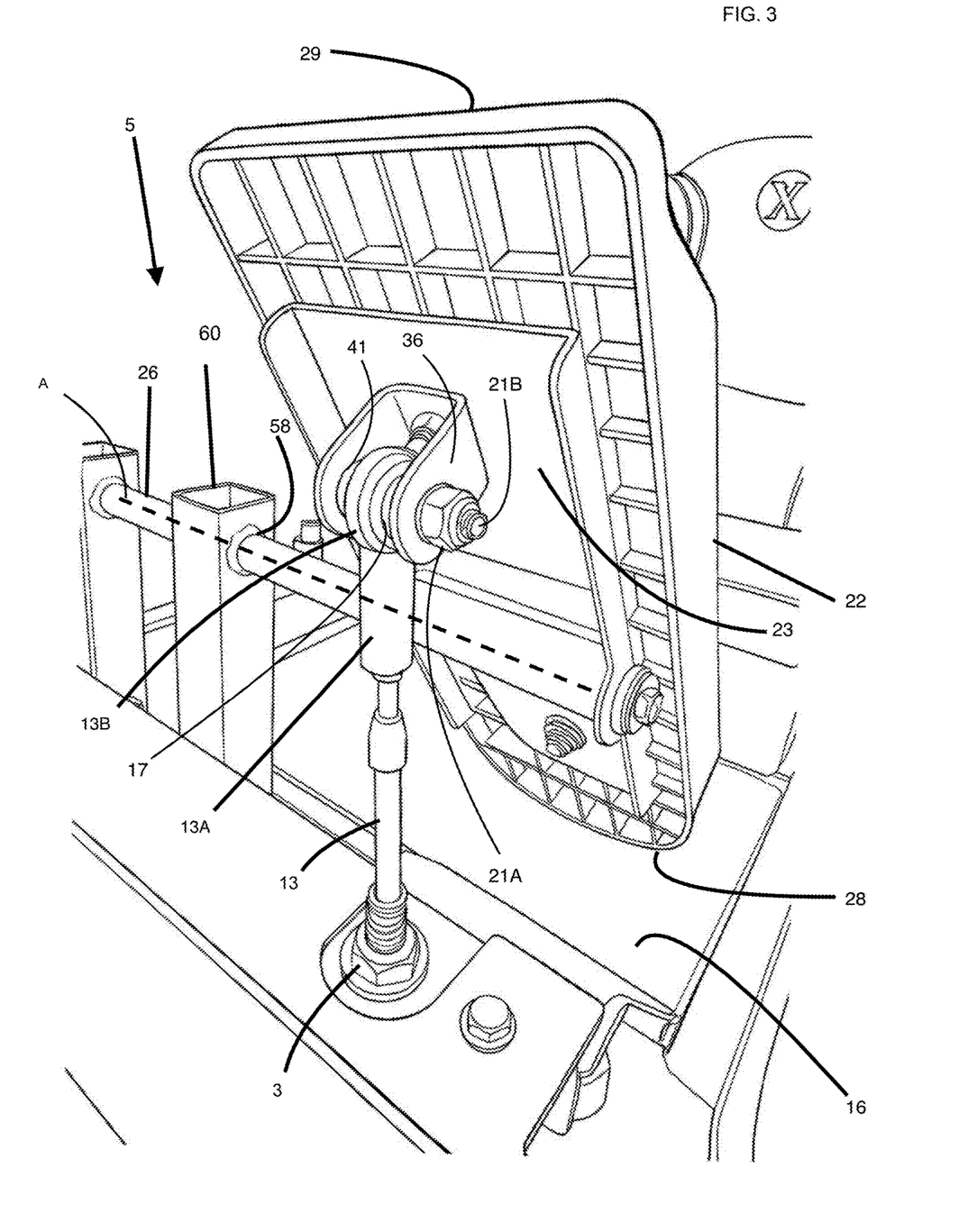
FIG. 3 is an illustration of a back side of pedal illustrating another aspect of the invention.
Figure 4:
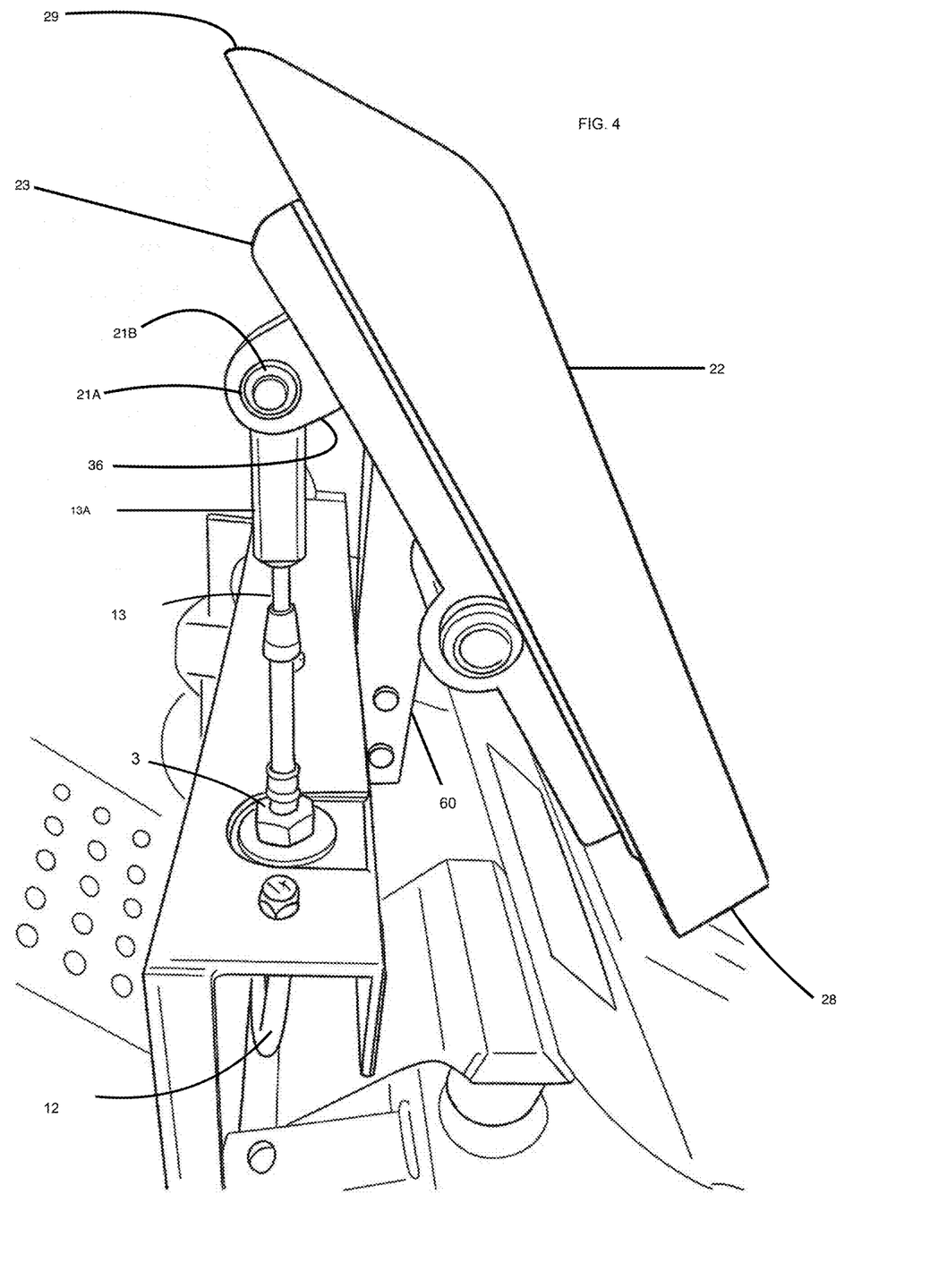
FIG. 4 is an illustration of a side view of pedal if FIG. 3

Preferably, the mounting can be adjacent a forward end 32 of a mower operator platform 16. Each pedal riser 60 includes coaxial bearing surfaces 58 through which the pivot rod 26 extends, the pivot rod 26 supporting the pedals 22,24 above the operator platform 16 in a manner permitting rotation about a common axis. In an example of FIG. 3, a flange 36 and 38 having an open surface 41, 42 respectively, can be mounted to an upper back side 23, 25 of respective pedal 22 and 24. An end linkage 13 and 15 which can comprise a rigid member is secured in position as follows. The end linkages 13 and 15 are connected and moved by the respective flexible push/pull cable linkages 12 and 14. End linkages 13 and 15 have a terminal portion 13A, 15A which have a bushing end 13B and 15B having an open surface 17 and 19, respectively to permit pivotally connection to flange 36 and 38 by way of a suitable means 21A and 21B, e.g., bolt and nut. The linkages 13 and 15 can be retained by a nut ferrule 3 which can be secured behind the pedal 22, 24 to operator platform 16, for example.

Figure 5:
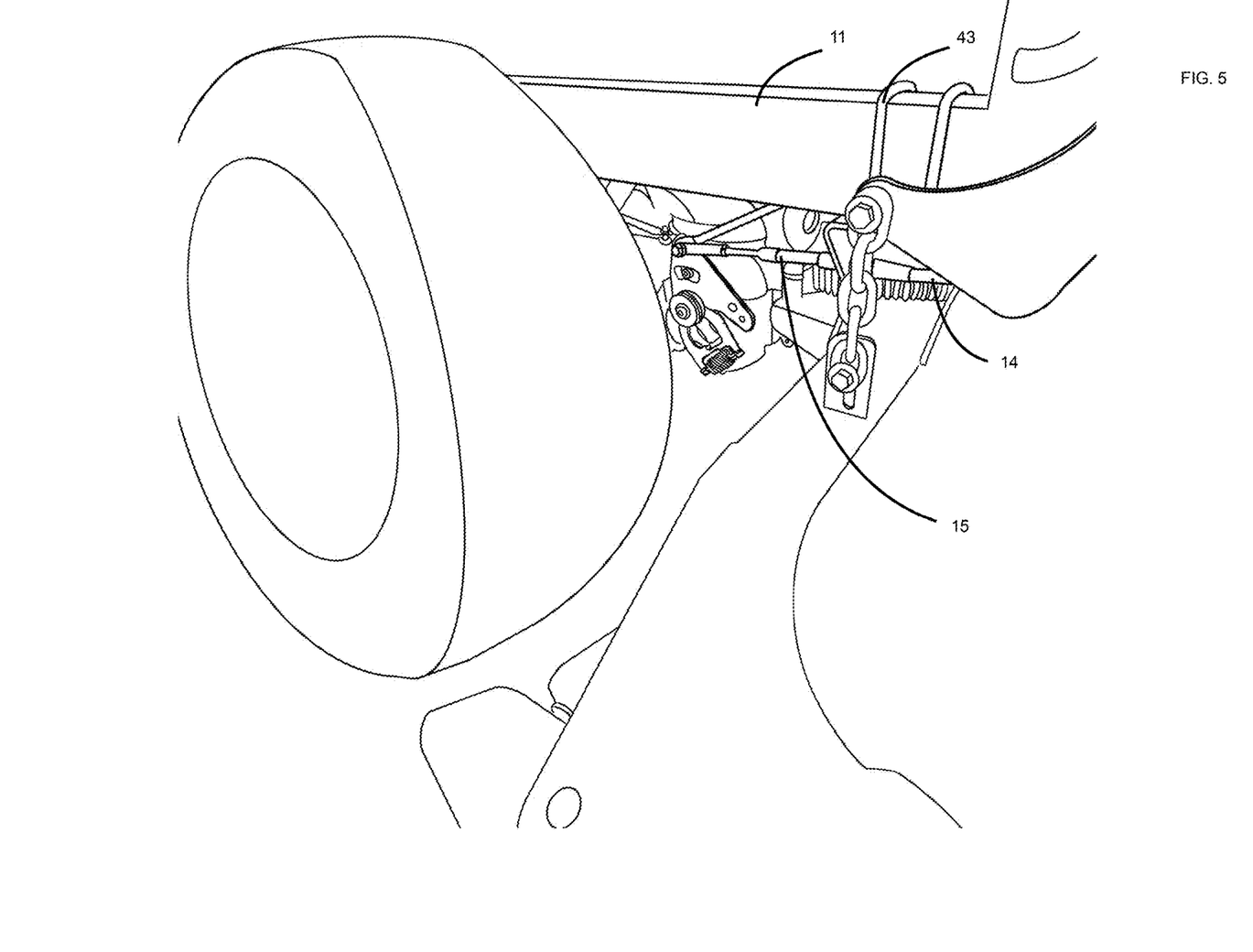
FIG. 5. is a side perspective illustration of a rear portion of another type of zero turn riding lawnmower implementing an embodiment of the invention for a sub-frame installation.

Another set of end linkages 25 and 27 which can comprise a rigid member is secured in position as follows. End linkages 25 and 27 are connected and moved by the respective flexible push/pull cable linkages 12 and 14, respectively. End linkages 25 and 27 have a terminal portion 25A and 27A which have a bushing end 25B and 27B having an open surface 65 and 67, respectively to permit pivotal connection to an arm 70 and 72 having and fulcrum portion 74 and 76, respectively, with an opening to align with respective open surface 65 and 67 and receive a bearing with lock pin 80 and 82 therethrough. FIG. 5 depicts another way of mounting the L-shaped flanged bracket 40 wherein U-bolts 43 and secure about the L-shaped flanged bracket 40 and secure to a part of the frame 11, for example.

Figure 6:
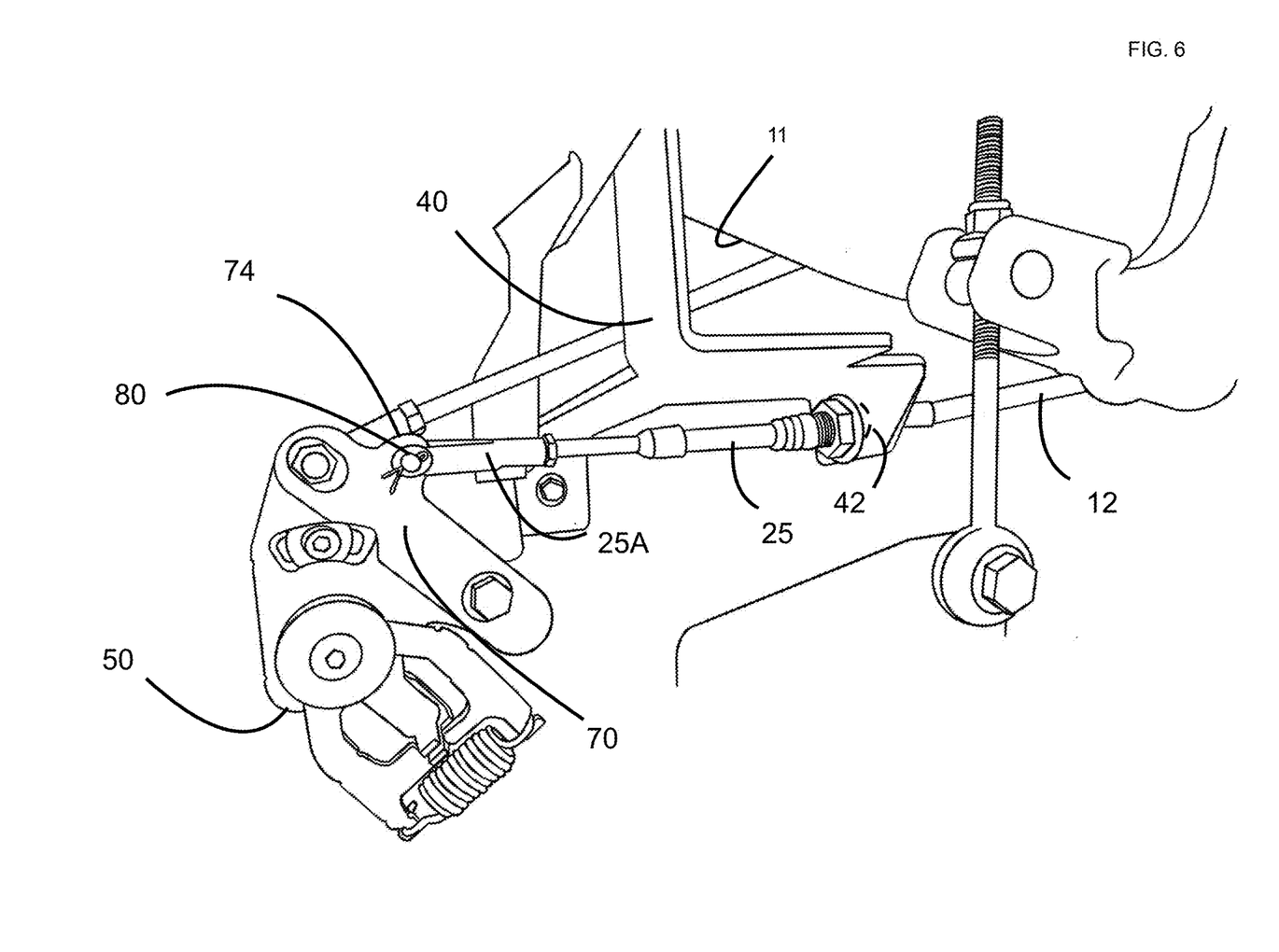
FIG. 6. is a left side perspective illustration for a sub-frame installation of still another type of zero turn riding lawnmower implementing an embodiment of the invention.
Figure 7:
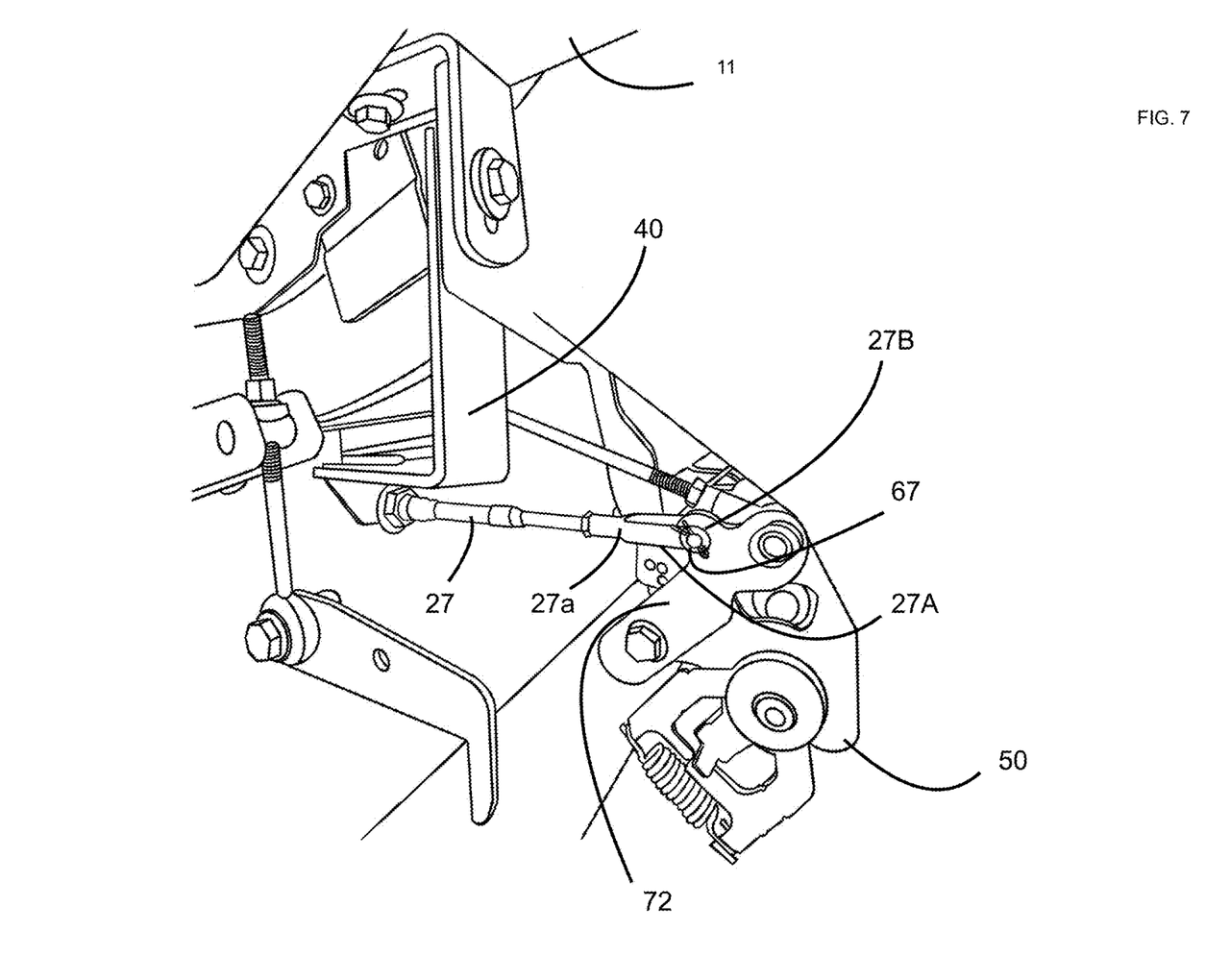
FIG. 7 is a right rear side perspective of the embodiment similar to that seen in FIG. 6.

The arms 70 and 72 as seen in FIGS. 5-7, depict a connection to a pre-existing actuator 50, such as a handle actuator, which can operate hydrostatic drive of of the mower 10. As earlier mentioned, this can the can also to a portion 18A, 18B of hand lever control as depicted in FIG. 1 or directly to hydrostatic drive 50.

The flexible push/pull cable linkages 12 and 14 can be retained and mounted to the operator platform 16, preferably underneath in cases which the mower 10 permits. The L-shaped flanged brackets 40 include an orifice 42 permitting free passage of the flexible push/pull cable linkages 12 and 14 therethrough while retaining their location out of way of potential damage or injury to the user. In this regard, sub-operator platform is a preferred location for the L-shaped flanged brackets 40 in order to retain the flexible push/pull cable linkages 12 and 14 and rigid linkages 13 and 15, respectively, in a manner to permit the desired function of movement to effectively control the forward and reverse functions described.

Figure 1:
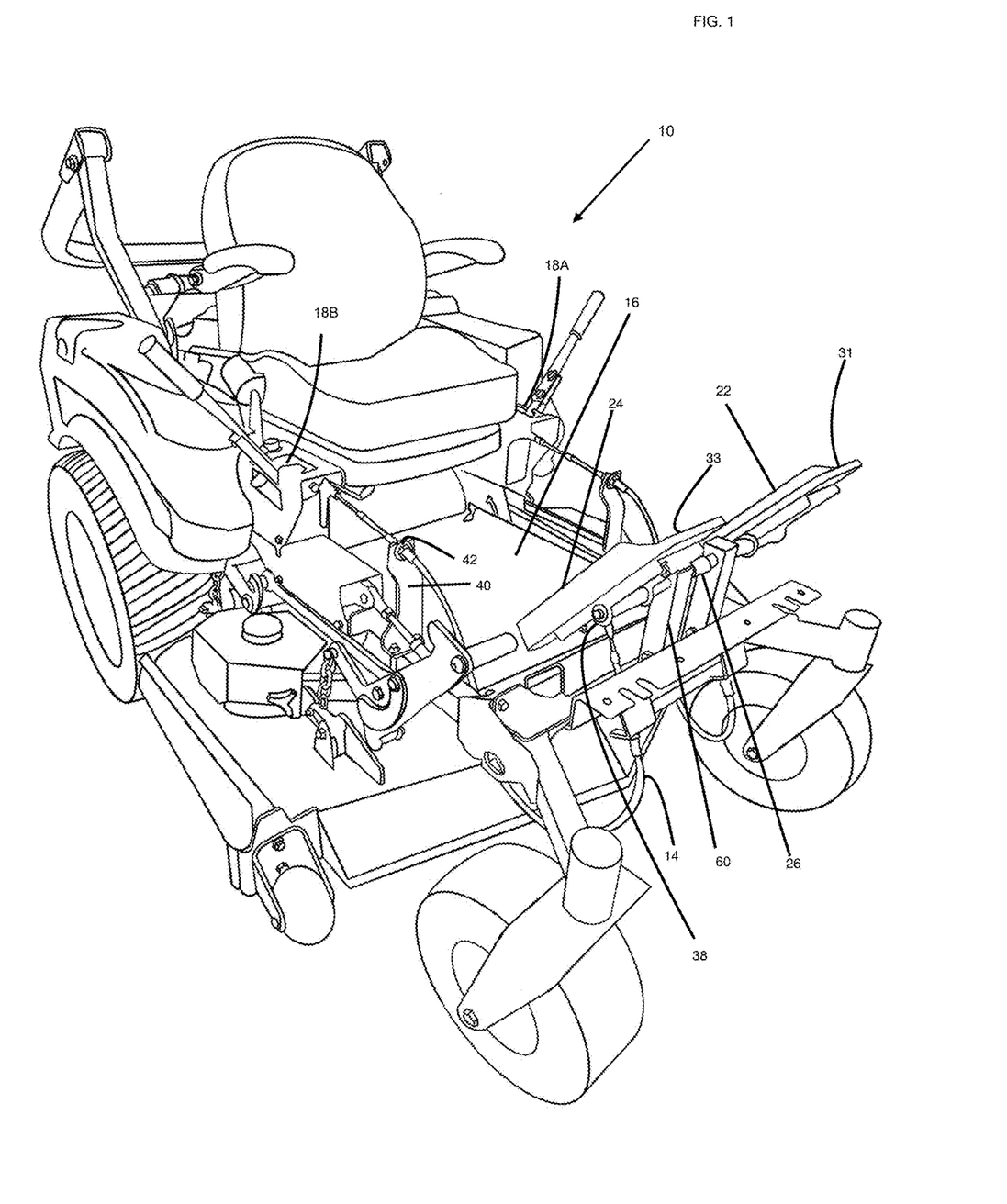
FIG. 1 is a perspective view of one type of zero turn riding lawnmower implementing an embodiment of the invention.

As shown in FIG. 1, a zero turn riding lawnmower 10 is constructed and/or modified to be steerable solely via first foot pedal 22 and second foot pedal 24. Each of first foot pedal 22 and second foot pedal 24 are connected to flexible push/pull cable linkages 12 and 14 of the zero turn riding lawnmower 10. First foot pedal 22 is constructed to cause at least one wheel on a first side the zero turn riding lawnmower to be powered in a forward direction or a reverse direction. Second foot pedal 24 is constructed to cause at least one wheel on a second side the zero turn riding lawnmower 10 to be powered in a forward or reverse direction. In this way, the zero turn riding lawnmower 10 can then be actuated by the user as a substitute for the hand levers.

By so providing, the invention provides an improved zero turn riding lawnmower mechanism 5 for the zero turn riding lawnmower 10 is steerable solely via a first foot pedal 22 and a second foot pedal 24 through the flexible push/pull cable linkages 12 and 14. Meanwhile, ingress and egress onto the zero turn riding lawnmower 10 is substantially improved with reduced risk of tripping of injury to the user.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A zero turn riding lawnmower steering mechanism for a zero turn riding lawnmower having a frame, a motor, wheels, an operator platform, and one of an electronic steering actuator, a hydrostatic drive, and a mechanical steering device, which includes:
    a first foot pedal operably connected to one of the electronic steering actuator, a hydrostatic drive and a mechanical steering device by way of a first flexible push/pull cable linkage, the first foot pedal constructed to cause at least one wheel on a first side the zero turn riding lawnmower to be powered in a forward direction or a reverse direction; and
    a second foot pedal operably connected to one of the electronic steering actuator, a hydrostatic drive, and a mechanical steering device by way of a second flexible push/pull cable linkage, the second foot pedal constructed to cause at least one wheel on a second side the zero turn riding lawnmower to be powered in a forward or reverse direction, wherein the zero turn riding lawnmower is steerable solely via each of said first foot pedal and said second foot pedal;
    and wherein each said first foot pedal and said second foot pedal are pivotally mounted to a pivot rod which extends through coaxial bearing surfaces of a support riser and such that said pivot rod is disposed above the operator platform; and
    wherein each said first and second flexible push/pull cable linkage is routed beneath the operator platform and retained by at least one bracket having an orifice permitting free passage of the linkage.

2. The zero turn riding lawnmower steering mechanism of claim 1, wherein said at least one bracket is flanged and disposed below the operator platform and is secured by U-bolts to a portion of the frame.

3. The zero turn riding lawnmower steering mechanism of claim 2, wherein said at least one bracket is L-shaped.

4. The zero turn riding lawnmower steering mechanism of claim 1, wherein said at least one bracket is flanged and disposed on the operator platform.

5. The zero turn riding lawnmower steering mechanism of claim 4, wherein said at least one bracket is L-shaped.

6. The zero turn riding lawnmower steering mechanism of claim 1, wherein each said first foot pedal and said second foot pedal has a top and a bottom which rotate about said pivot rod which is inwardly disposed of said top and said bottom.

7. The zero turn riding lawnmower steering mechanism of claim 1, wherein said at least one bracket is disposed on the operator platform and secured by a nut ferrule connection.

8. The zero turn riding lawnmower steering mechanism of claim 1, wherein said first flexible push/pull cable linkage includes a rigid end linkage and bushing at each end thereof and said second flexible push/pull cable linkage includes a rigid end linkage and a bushing at each end thereof wherein said rigid end linkages are connected between said flexible push/pull cable linkages and respective foot pedals and said hydrostatic drives.

* * * * *